United States Patent [19]

Valentino

[11] Patent Number: 4,648,037

[45] Date of Patent: Mar. 3, 1987

[54] METHOD AND APPARATUS FOR BENEFIT AND FINANCIAL COMMUNICATION

[75] Inventor: James A. Valentino, Staten Island, N.Y.

[73] Assignee: Metropolitan Life Insurance Company, New York, N.Y.

[21] Appl. No.: 590,047

[22] Filed: Mar. 15, 1984

[51] Int. Cl.⁴ .......................................... G06F 15/30
[52] U.S. Cl. ................................... 364/408; 364/900; 235/379
[58] Field of Search ............... 364/408, 200 MS File, 364/900 MS File; 235/379, 380, 381

[56] References Cited

U.S. PATENT DOCUMENTS

| | | | |
|---|---|---|---|
| 4,319,336 | 3/1982 | Anderson et al. | 364/900 |
| 4,321,672 | 3/1982 | Braun et al. | 364/900 X |
| 4,334,270 | 6/1982 | Towers | 364/408 |
| 4,438,326 | 3/1984 | Uchida | 364/408 |
| 4,460,960 | 6/1984 | Anderson et al. | 364/900 X |
| 4,484,304 | 9/1984 | Anderson et al. | 364/900 |
| 4,520,457 | 5/1985 | Hagler | 364/900 |
| 4,597,046 | 6/1986 | Musmanno et al. | 364/408 |

FOREIGN PATENT DOCUMENTS

EP0014312 8/1980 European Pat. Off. ............ 364/408

OTHER PUBLICATIONS

Real Estate Investment Analysis System, IBM Tech. Disc. Bulletin, vol. 13, No. 11, Apr. 1971.
Middle Market Target for Cash Management, ABA Banking Journal, Oct. 1980.

Primary Examiner—Jerry Smith
Assistant Examiner—Charles B. Meyer
Attorney, Agent, or Firm—Kenyon & Kenyon

[57] ABSTRACT

The disclosure relates to the method and apparatus of a communication system for enabling an employee to access information by a terminal concerning their up-to-date savings plans and the values thereof, withdrawal information, explanations of provisions, employee benefit information (e.g., group life insurance, disability coverage, vested retirement, etc.), explanations of savings plan and benefit options, and benefit news bulletins. The system is adapted to provide information to an employee dependent upon interaction by the employee, such as forecasts of accumulated values of voluntary salary savings and other deferred compensation programs, forecasts of dollar benefit of new savings plans, IRA's, the results of different combinations of benefit coverages and the implications of each variation of programs and plans, as well as the results of "what if" financial games. The system can also provide transactional services by which the benefit and financial programs can be changed by the employee in a manner that affects the existing benefit and/or financial programs, such as, savings plan option selection, moving monies from one fund to another, withdrawals, etc.

41 Claims, 15 Drawing Figures

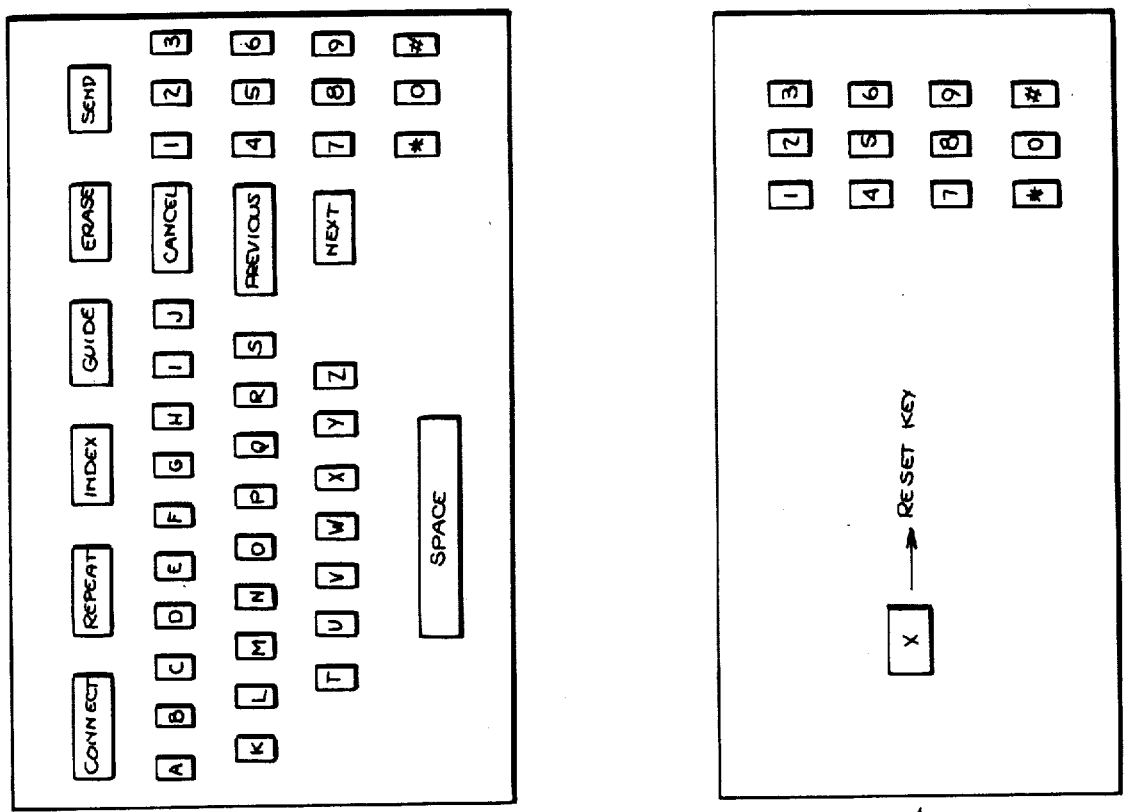
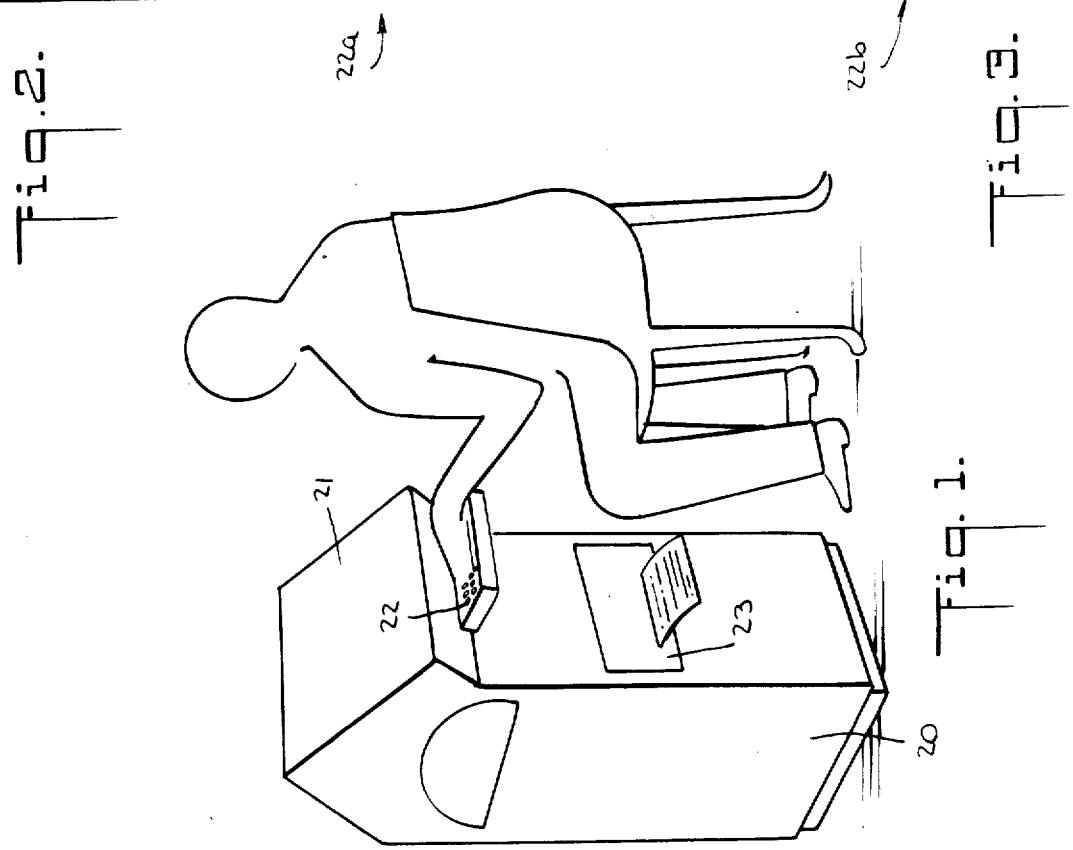
Fig. 2.
Fig. 3.
Fig. 1.

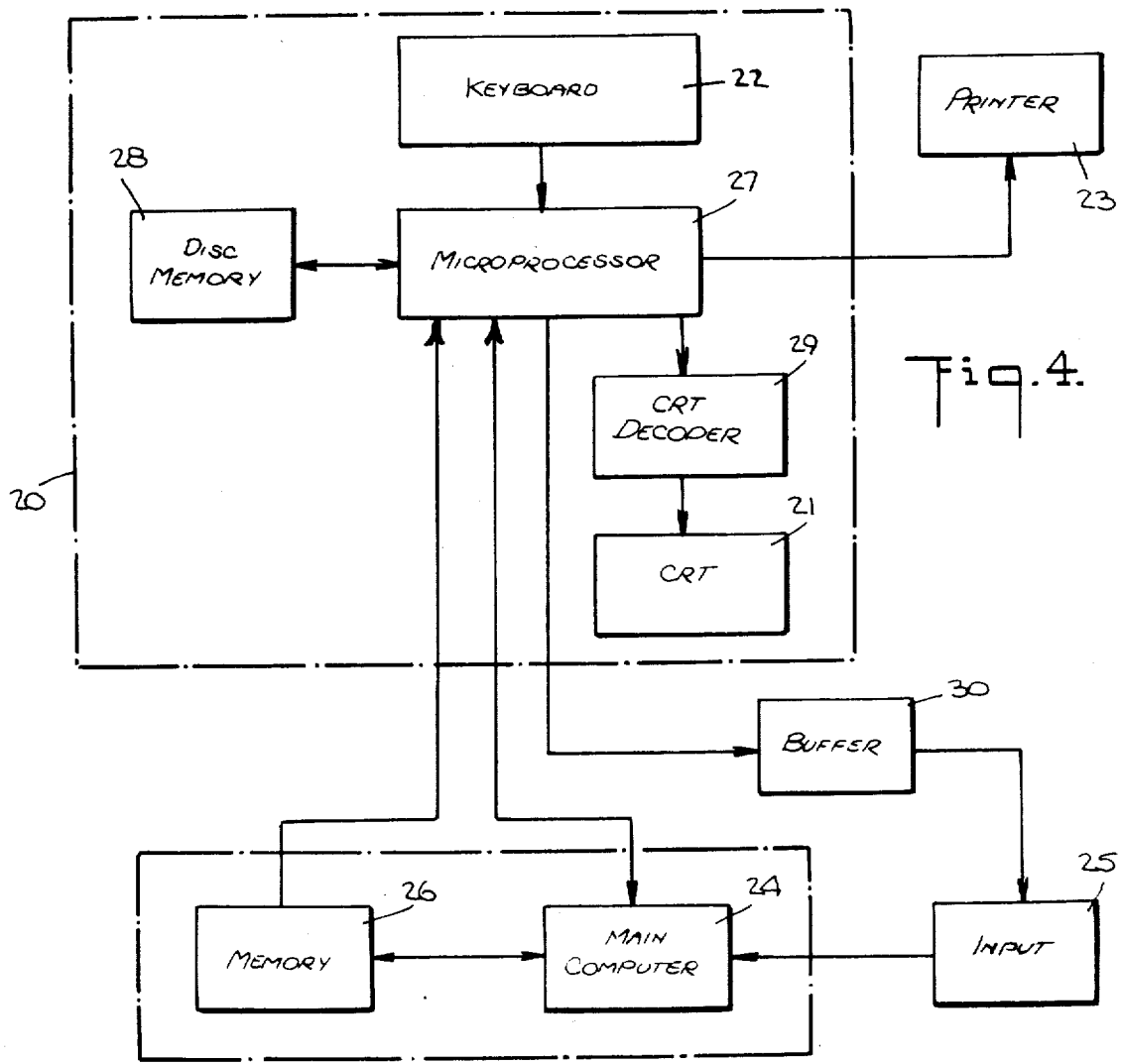

COMPANY
FINANCIAL INFORMATION SERVICE

I & R

| 1 | YOUR HEALTH CARE PACKAGE (MEDICAL AND DENTAL) |
| 2 | YOUR DISABILITY BENEFITS |
| 3 | YOUR GROUP INSURANCE |
| 4 | YOUR SAVINGS AND INVESTMENT (SIP) |
| 5 | YOUR VOLUNTARY RETIREMENT SAVINGS ACCOUNT (VRSA) |
| 6 | YOUR RETIREMENT BENEFITS |

ENTER SELECTION AND PRESS SEND. PRESS GUIDE IF YOU NEED HELP. IF YOU ARE FINISHED, ENTER 7 AND PRESS SEND

COMPANY
FINANCIAL INFORMATION SERVICE

RETIREMENT BENEFITS

| 1 | INQUIRY |
| 2 | LOOKING AHEAD |

ENTER SELECTION AND PRESS SEND. PRESS INDEX TO RETURN TO I+R CHOICES. IF YOU ARE FINISHED, ENTER 6 AND PRESS SEND

COMPANY
FINANCIAL INFORMATION SERVICES
RETIREMENT INCOME
LOOKING AHEAD

IF YOU RETIRE AT AGE  65

WITH A FINAL AVERAGE SALARY OF $  25,000

(OVER LAST 60 MONTHS) YOUR TOTAL ANNUAL RETIREMENT INCOME WILL BE:

$  12,698.03

PRESS INDEX TO RETURN TO RETIREMENT CHOICES.

COMPANY
FINANCIAL INFORMATION SERVICES
RETIREMENT INCOME
LOOKING AHEAD

IF I RETIRE AT A CERTAIN AGE, WHAT WILL BE MY RETIREMENT INCOME?

○ YOUR AGE AT RETIREMENT →

○ YOUR ESTIMATE OF YOUR FINAL SALARY BEFORE RETIREMENT
(IF YOU DO NOT HAVE A VALUE IN MIND THE PROGRAM WILL ASSUME A 5% RATE OF GROWTH OF YOUR PRESENT SALARY UNTIL RETIREMENT)

$

TYPE THE RELEVANT VALUES LINE BY LINE; PRESS  SEND  AFTER COMPLETING EACH LINE

PRESS INDEX TO RETURN TO RETIREMENT CHOICES.

Fig. 12.

COMPANY
FINANCIAL INFORMATION SERVICES

S.I.P. TRANSACTIONS

CHANGE THE ALLOCATION BETWEEN FUNDS

EACH FUND CAN RECEIVE A SHARE OF 0%, 25, 50, 75, OR 100% OF THE CONTRIBUTION. YOU HAVE THE POSSIBILITY TO MODIFY OR CONFIRM YOUR CURRENT ALLOCATION.

NEW BASIC CONTRIBUTION ALLOCATION:
- FIXED INCOME     _ _ _% } TOTAL
- EQUITY           _ _ _% } 100%
- INDEX            _ _ _%

NEW SUPPLEMENTAL CONTRIBUTION ALLOCATION
- FIXED INCOME     _ _ _ } TOTAL
- EQUITY           _ _ _ } 100%
- INDEX            _ _ _

TYPE THE RELEVANT VALUE LINE BY LINE. PRESS [SEND] AFTER COMPLETING A LINE, AT THE END OF THE PAGE: PRESS: [NEXT]

PRESS INDEX TO RETURN TO SIP CHOICES.

Fig. 13.

COMPANY
FINANCIAL INFORMATION SERVICES

S.I.P. TRANSACTIONS

TRANSFER AUTHORIZATION

YOU CAN EXCHANGE INVESTMENT UNITS CREDITED TO YOUR ACCOUNTS BY INCREMENTS OF 10%

THE ACCOUNTS NAMES ARE:
FIXED    EQUITY    INDEX

%    UNITS    FROM    TO

_ _% BASIC   _ _ _ _ _ _ _ _

_ _% SUPP    _ _ _ _ _ _ _ _

TYPE EACH RELEVANT VALUE, THEN PRESS [SEND]
AT THE END OF THE PAGE; PRESS [NEXT]
PRESS INDEX TO RETURN TO SIP CHOICES

Fig. 14.

COMPANY
FINANCIAL INFORMATION SERVICES

S.I.P. TRANSACTIONS

WITHDRAWAL AUTHORIZATIONS

ENTER THE AMOUNT DESIRED AS A WITHDRAWAL   $ _ _ _ _ _ _

ENTER THE AMOUNT AND PRESS SEND
PRESS INDEX TO RETURN TO SIP CHOICES

Fig. 15.

COMPANY
FINANCIAL INFORMATION SERVICES

S.I.P. TRANSACTIONS

CONFIRMATION

YOUR TRANSACTION HAS BEEN RECORDED AS ENTERED.
A WRITTEN ACKNOWLEDGEMENT WILL BE SENT TO YOU SHORTLY.

THANK YOU FOR USING F.I.S.

PRESS INDEX TO RETURN TO SIP TRANSACTIONS.

METHOD AND APPARATUS FOR BENEFIT AND FINANCIAL COMMUNICATION

BACKGROUND OF THE INVENTION

1. Field of the Invention

This invention relates to a comprehensive employee benefit and financial communication system. More particularly, the benefit and financial communication system includes a center which is a conveniently located facility on the premises containing an easy-to-use unattended computer terminal that an employee having no formal training can operate for a number of purposes including inquiries, transactions, and forecast concerning benefits, savings plans, and financial service information.

2. State of the Prior Art

It is customary for employers or insurance companies on behalf of employers to maintain employee benefit and financial information on mainframe computers. These computers output benefit information in various forms, often in formats which are only meaningful to benefit administrators or those familiar with the benefit system due to the use of extensive coding and numerical data. Periodically, typically annually or semi-annually, personalized benefit statements detailing the status of an employee's benefits are produced and delivered to the employee. At any other time during the year if an employee desired similar information on a current basis, he or she must initiate an inquiry to the appropriate department of the employer, usually the benefits administrator. The benefits administrator would then format an interrogation and refer it to the appropriate data entry input unit or directly input the request to the mainframe computer. The computer would thereafter provide the information, usually in some coded and numerical form. This information enables the benefits administrator to prepare the appropriate response in a form which can be readily understood by the employee. Under the best of conditions, this inquiry process can take several days.

Banks have recognized the importance of personalized direct electronic access of bank account information by individual customers by use of automated teller machines (ATM). These machines provide customers with the ability to make inquiries as to their account balances and to direct that simple banking transactions be performed; however, such automatic teller machines are not adapted to present the relatively complex information such as that connected with employee benefit plans or to enable individuals to select options and to seek projections describing what savings or withdrawals in various amounts and under various conditions might mean to them in the future.

SUMMARY OF THE INVENTION

The benefit and financial communication service of the present invention utilizes an easy-to-use unattended computer terminal for the direct use of employees who are generally untrained with respect to the operation of a computer terminal. The invention is based upon a synthesis of technology and various business expertise (as found in areas concerned with employee benefit planning, financial planning, retirement planning, etc.) to create a unique communication and education medium. The invention includes a terminal supported by a sophisticated computer-based process which delivers various services.

It is an object of the invention, referred to as a benefit and financial communication service, to provide useful benefits, savings and other financial information to employees. The system of the invention enables the employee to access information concerning their up-to-date savings plans and the values thereof, withdrawal information, explanations of provisions, employee benefit information (e.g., group life insurance, disability coverage, vested retirement, etc.), explanations of savings plan and benefit options, and benefit news bulletins.

It is a further object of the invention to provide information dependent upon interaction by the employee, such as forecasts of accumulated values of voluntary salary savings and other deferred compensation programs, forecasts of dollar benefit of new savings plans, IRA's, 401K's, etc., the results of different combinations of benefit coverages (as would be required under a flexible benefit plan arrangement) and the implications of each variation, as well as the results of "what if" financial games.

It is another object of the invention to provide transactional services by which the benefit and financial programs can be changed in a manner that affects the existing benefit and/or financial programs, such as, savings plan option selection, moving monies from one fund to another, withdrawals, etc.

The benefit and financial communication service provides a powerful tool for corporations to use in providing benefit and financial information directly to employees based on the plans offered by their corporate employers. The invention has its roots in a data processing system environment; however the invention significantly enhances the manner of presentation. The system design focuses on presenting benefit and financial information in an easy-to-use format and on demand basis, thus eliminating the benefits administrator from the basic inquiry function and improving the turnaround time from several days to seconds and minutes. The only prerequisite to using the benefit and financial communication service is that the individual be an employee of the corporation sponsoring the employee benefit and financial planning center.

These and other objects and advantages of the invention will become more apparent by referring to the following detailed description and drawings.

BRIEF DESCRIPTION OF THE DRAWINGS

FIG. 1 is a perspective view of a terminal used in the benefit and financial communication service of FIG. 4;

FIG. 2 is a sample keyboard as found in the videotex environment;

FIG. 3 is a sample keyboard as found in the VM environment;

FIG. 4 is a block diagram of the principal elements of a benefit and financial communication system constructed in accordance with the invention;

FIG. 6 is a representation of a CRT display of choices which can be made by the user;

FIG. 7 is a representation of a CRT display of a choice screen directed at a specific benefit topic;

FIG. 8 is a representation of a CRT display of a screen directed at the acceptance of employee-entered information for interactive services;

FIG. 9 is a representation of a CRT display of a screen presenting data derived from calculations using current and/or employee entered data;

FIG. 10 is a representation of a CRT display of a choice screen directed at a specific benefit topic;

FIG. 11 is a representation of a CRT display of a screen directed at the acceptance of employee-entered information for transactional services;

FIG. 12 is a representation of a CRT display of a screen directed at the acceptance of employee-entered information for transactional services;

FIG. 13 is a representation of a CRT display of a screen directed at the acceptance of employee-entered information for transactional services;

FIG. 14 is a representation of a CRT display of a screen directed at the acceptance of employee-entered information for transactional services; and FIG. 15 is a representation of a CRT display of a screen indicating that an employee-requested transaction has been performed.

DETAILED DESCRIPTION OF THE INVENTION

Figure 5:
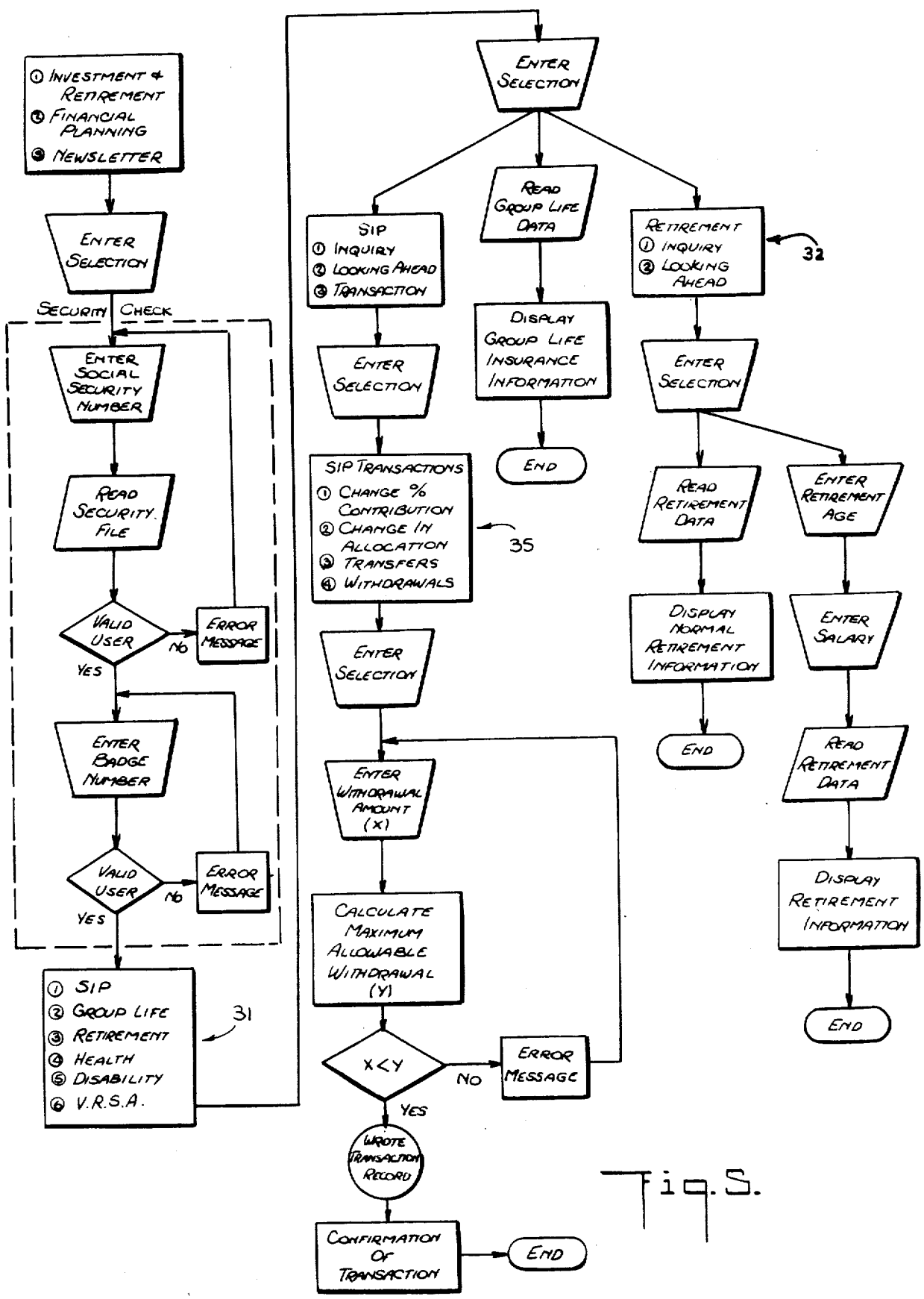
FIG. 5 is a flow chart illustrating a portion of the computer-based process for performing inquiry, transactional, and interactive (e.g., forecasting, "what if", etc.) services.

The drawings describe the process by which employees by means of the benefit and financial communication service can obtain personalized information in confidence since they no longer require the services of another individual to obtain this information for them and to obtain the information whenever they wish, and with immediate results.

The direct link between the service and the employee is the terminal or kiosk 20, shown in FIG. 1. Terminal 20 comprises at least a CRT (cathode ray tube) or display screen 21 and a keyboard 22. The terminal is especially adapted for ease-of-use and interactive communication with the computer. Through the terminal keyboard 22 the employee enters personal identification, initiates basic inquiries and transactions, enters financial information, and requests printing of displayed data. FIGS. 2 and 3 illustrate keyboards 22a and 22b for use with systems that interface with the employee in the videotex (22a) and VM (22b) formats, respectively.

The CRT 21 enables the employee to view the information presented. One of the first screens displayed on the CRT 21 is an introductory screen which welcomes the employee to the benefit and financial communication service. The introductory screen is followed by the screen(s) requesting personal identification number(s) once an employee makes a request for information by introducing a first instruction. The introductory screen is displayed once again when an employee concludes his session with the terminal, thereby resetting the benefit and financial communication service for the next employee. The screens displayed by the terminal guide the employee from screen to screen and therefore from topic to topic, until the employee terminates the session with the computer. Each screen is predefined with text and graphics, except for areas left blank, in order that the program moudles can add variable data which is data made available directly from the database and/or computed data. In this way the screens serve as a mask which the subprogram uses to superimpose over the personal benefit and/or financial information.

A terminal 20 is usually located in the lobby of the corporation's office(s) where privacy can be ensured; however, the benefit and financial communication terminal 20 can be located in any area which the corporation deems appropriate. There can be provided several benefit and financial communication terminals to serve the needs of the employees of the corporation, thereby making it possible for several employees to communicate simultaneously with the computer.

The benefit and financial communication terminal 20 is "powered-up" on a daily basis through a log-on procedure. Each of the screens in the system are associated with a program module that is a specialized program for performing particular functions. The program module accepts the employee's input, obtains the required screens and data, performs the necessary calculations, inserts the appropriate information on the screens, and handles the dialogue with the employee for as long as the employee remains in that information set (i.e., until the choice of another information set is made by the employee). Each benefit and financial communication service is customized to reflect the particular corporation's employee benefit plans, other financial programs and the systems environment; however, the benefit and financial communication service provides for a common core set of modules which are preprogrammed to perform the basic services, e.g., inquiry, transactional, and interactive ("what if") capabilities.

Players in the Benefit and Financial Communication Service

1. The user—The employee or consumer who uses the benefit and financial communication service for information retrieval, "what if" games (interactive capability), and generating transactions.
2. The communications network provider (e.g., common carrier).
3. The system operator—The corporation which operates the system, i.e., manages the service, controls the access, and monitors usage.
4. The information service provider (e.g., the sponsoring corporation whose information is presented by the system).

System Configuration

As shown in FIG. 4, the system configuration comprises a plurality of components including an unattended stand-alone terminal/koisk 20, the database in memory 26, the computer 24 and the software therefor, and the communication facilities.

The invention requires the functionality of each component, but is not dependent on a specific manufacturer, software vendor, model or type of hardware. The invention can be delivered in various formats such as by a dumb or intelligent terminal with communications facilities to a large mainframe, by a personal computer which uses a floppy disk, or by a T.V. monitor and decoder. The employee can communicate with the system by utilizing any one of various media such as a video display screen 21 with specially adapted keyboard 22, a touch-sensitive video display, or by voice. The system can interface with the employee by means of various formats including a VM format (22b), a videotex format (22a), a print format, a video disk format, or a voice format.

Benefit and financial communication services can be supported with any one or several of the different technologies referred to above. Therefore, at any one time it is conceivable that benefit and financial communication services can be configured differently depending on the needs of the coporation and the available hardware and software. Nevertheless, the benefit and financial communication service is based on a preprogrammed set of modules which perform the basic services, e.g., inquiry, transactional, and interactive ("what if") capabilities. Although it is possible for the hardware and some of the supporting software to differ among different benefit and financial communication services, the purpose and functionality of the services remain the same from the point of view of both the corporation which is looking to enhance its benefit and financial communication network and the employee who will utlimately benefit from the inquiry, transactional, and interactive capabilities being offered.

A block diagram of the system configuration is shown in FIG. 4. The system includes a main computer 24 having an input 25 for receiving information concerning the employee's benefit program. This information is updated on a periodic basis. When entered and processed by the computer 24, the information is then stored as part of the database in memory 26 in a format which allows the particular information to be addressed by the category of the information being sought (such as savings or investments) and by the employee's identification number.

The benefit and financial communication service also includes a terminal 20 which, as previously indicated, is located for convenient availability to employees and can be operated without any special training. The terminal 20 can be programmed by either a program from the main computer 24, or by means of a microprocessor 27 and memory 28 (such as disc memory) within the terminal 20. The CRT decoder 29 is the software and hardware that supervises and controls the operation of the CRT displays. For example, videotax software may be used in order to present alphanumeric information, graphic and color formatting, and the like to the CRT 21 for display of information to the employee. Text information is presented on the CRT 21 to the employee with appropriate instructions as to which keys on the keyboard 22 should be pressed in order to request specific information. The keyboard 22 also enables the employee to enter identification and personal financial data into the computer 24. Details of savings and investment plans and the like are drawn from the database in the memory 26 and the main computer 24 for each employee. For a given employee, the main computer 24 calculates the future value of benefit program options under various conditions. As a result, by means of the terminal 20, the employee can conveniently review the status of all aspects of his benefit program.

The benefit and financial communication service also enables the employee to change his benefit program by introducing transaction commands into the keyboard 22 in response to instructions provided on the CRT 21. Such commands may be executed immediately and entered into the main computer 24 and the database in memory 26, or the commands may instead be transmitted to the buffer 30 for introduction into the input of the main computer 24, only after some independent confirmation of the transaction is received by the employee and the benefits department of the employer. A printer 23 can be included in the benefit and financial communication system in order that the employee can obtain a written record of all displayed information by entering the appropriate command into the terminal keyboard 22.

Software & Displays

The system's database comprises an abstract of the employee files and contains all the information necessary to respond to basic inquiries concerning the employee's current benefits, coverages, account balances, and interactive transactions. The abstract is created on a periodic basis using the employer's mainframe and is loaded into the system memory 26. At the time the abstract is loaded, several predefined calculations can be performed to establish values that remain constant during the period covered by the abstract. This eliminates the process of repeatedly valuing fixed data. The results of the calculations are made part of the database.

The introductory screen, presented to the employee upon visiting the benefit and financial communication terminal 20, is under the control of the appropriate program module. On the introductory screen, the employee is instructed to press a particular key, depending upon whether the employee wishes to receive instructions or to bypass the instructions and to continue. The system will then bring up the appropriate screen and information. Once the employee has read the instructions and the appropriate key is pressed to indicate a desire to continue (or once this choice is bypassed), the personal identification screen (ID) is displayed. The ID screen (one or several depending on the corporation's security scheme) instructs the employee to enter his personal identification, which can take the form of a social security number, employment number, and/or personal identity number. The employee enters the appropriate numbers via the keyboard 22. The system then responds by displaying another screen or with instructions to re-enter the number because the system is unable to match the identification which the employee has entered. The identification is validated by the system, more specifically the appropriate program module, before the employee is able to continue with the session. Each time a separate identification is entered, the validation procedure is repeated. Some of the information on the benefit and financial communication service may not require security measures, and if so, the identification procedure can be eliminated. Each corporation determines the extent of security to be incorporated in the system.

A valid identification results in the display of a choice (menu) screen which offers benefit and financial options that can be selected. In the alternative the display may comprise a message reciting that the employee does not participate in the benefits program/plan or that the employee should consult with a particular department of the corporation for assistance and information.

A benefit and financial communication service will have several, if not many, choice screens. These screens are designed to direct the employee quickly to the benefit and financial information desired without a great amount of dialogue. The first choice screen may be broad in scope, but subsequent choice screens may be directed to specific benefit and financial topics. The employee is requested to make a selection from the choices indicated, and based on the employees's selection, the appropriate program module will retrieve the necessary data from the database in memory to respond to the inquiry and will handle the dialogue associated with that choice. This can involve several activities, including the following.

(1) the display of predefined text
(2) the presentation of personal financial data that originated in the database
(3) the presentation of financial data derived from calculations involving current and/or employee entered data (4) the acceptance of information for transactioons and "what if" games.

Non-choice screens discuss a variety of topics, some of which cover:
(1) the various employee benefit offerings
(2) the employee's participation or lack of participation in these benefits
(3) the balances in savings and/or investment accounts
(4) the amounts available for withdrawal from accounts
(5) contributions made during a specific period
(6) period of suspension from a benefit
(7) group insurance amounts
(8) retirement benefits
(9) changes and/or new benefits
(10) disability benefits
(11) flexible benefits (cafeteria plans)

The subject matter and textual content of the screens are based on the corporation's particular plans and programs.

The method used for performing typical inquiry, transactional, and interactive services is illustrated in the flow chart shown in FIG. 5. After the introductory screen is displayed, FIG. 5 shows that a choice screen can be displayed on the CRT 21. The employee then follows instructions on the choice screen which direct the employee which keyboard keys to depress in order to choose particular benefit topics. The employee's input is accepted by the program module associated with the choice screen. Depending upon the employee's input, a pre-defined screen is obtained and displayed, and control of the employee-computer dialogue may be transferred to another program module.

FIG. 5 shows the steps taken when the employee desires information about a particular benefit topic that is protected by a security system. These steps prevent unauthorized access to personal information. In addition, identifying information entered by the employee is accepted by the program module and is used to access the extract of the employee's files stored in the database in memory 26.

After the computer 24 verifies that the user is authorized to view the requested information, a program module associated with the particular benefit topic selected takes control and displays a choice screen directed at even more specific benefits information. As described above for the more general choice screen, the employee follows directions and chooses among the benefit topics. FIG. 5 shows the steps taken following choice of several specific benefit topics. In the videotex environment, the use of some of the keys on keyboard 22a are not specified on every screen, but knowledge of them is obtained upon signing on to the system and following the instructions to use the guide key for help. In the VM environment, the function keys which are required are detailed on each screen and such a listing is not necessary.

Selection of group life information by the employee results in the performance of the benefit and financial communication service's inquiry service. The appropriate program module reads the group life data in the database relevant to this employee in order to fix the values of certain financial information that vary among employees. Once the computer 24 has determined the proper values for all variable data, the program module displays the predefined text relating to group life benefits along with the personal financial data originating from the database. The employee views the information displayed, and is instructed on how to obtain a printout, make another choice, or end the session.

Selection of retirement benefits by the employee gives the employee a choice between inquiry service or interactive ("what if") service. The employee follows directions on the choice screen and uses the keyboard 22 to indicate which service he wants performed. FIG. 6 illustrates the CRT display of the choice screen 31 that instructs the employee how to access several benefit information topics. Once the employee presses "6" on the keyboard 22a and "SEND", the CRT display of FIG. 7 is displayed. This is another choice screen 32 which enables the employee to depress "2" on the keyboard 22a and "SEND" in order to request interactive services.

FIG. 8 is the CRT display of the screen 33 directed at instructing the employee how to enter data in order to find out how his particular retirement benefits will vary under differing conditions. The appropriate program module accepts the data entered by the employee through the keyboard 22a in response to instructions in FIG. 8. This program module allows the employee to vary retirement age and ending salary. The program module then reads any retirement data in the database relevant to this particular employee, makes financial calculations based on data contained in the database in memory 26 and entered by the employee via the keyboard 22, and displays the CRT screen 34 shown in FIG. 9. The program module displays predefined text along with the employee entered conditions and the calculated financial information. Obviously, the calculated financial information displayed on the screen varies, depending upon the data entered by the employee and the personal financial data in the employee's files.

Selection of S.I.P. (Savings & Investment Plan) information by the employee gives the employee a choice between inquiry, interactive, and transactional services. FIG. 10 illustrates the screen 35 displayed on the CRT after the employee selects transactional services. The employee is presented with a choice screen allowing him to select one of several transactions affecting his S.I.P. account. FIGS. 11, 12, 13 and 14 comprise the CRT screens 36, 37, 38, 39, respectively displayed by the program module, depending upon the type of transaction desired. The screens indicate what information must be entered by the employee to effect the transaction, and instruct the employee how to do it. The program module accepts the information entered and either executes the transaction immediately, or else transmits the transaction data to the buffer 30 for subsequent introduction into the computer input 25. The program module also displays the CRT screen 40 illustrated in FIG. 15, which verifies that a transaction has been entered into the terminal 20.

The flow chart in FIG. 5 does not describe all steps and all options since those skilled in the relevant art can readily understand the method used for performing inquiry, transactional and interactive services based upon the foregoing examples.

An understanding of the functionality of the benefit and financial communication service can be obtained from the following sample of the types of requests employees could bring to the benefit and financial communication service:

1. Inquiry Function
   What are my medical benefits?
   What is my disability benefit?

What is my income during an illness absence?
What is the balance in my savings and/or investment account?
How much can I borrow/withdraw from my savings account without incurring a penalty?
How much can I borrow/withdraw from my account and what are the tax implications?
What is my group insurance coverage and value?
What dependent coverage do I have?
What is my retirement date and what amount is available?
How do I submit a claim for a benefit?
What are the provisions of a particular benefit?
What is the cost of the benefit?
What are the flexible benefit options?

2. Interactive Function ("What if" exercises)
What is the value of my fixed income fund in the future?
What is the suspension period or penalty if I borrow/withdraw a certain amount from my savings and/or investment account?
If I save a certain amount on a lump sum basis or periodically, what will I accumulate over a certain period of time?
If I want to have a certain amount of money in five years, what do I need to save now?
What is my retirement income if I retire in 10 years or at age 60?
Given my present level of savings and/or investment contribution, how can I maximize it?
How can I spread my present level of savings and/or investment contribution among various plans to achieve maximum savings?
What combination of benefits gives me the most coverage at the least cost?
How can I minimize my out-of-pocket medical expenses?
What does a flexible benefit program mean to me?
What are the implications of selecting a particular combination of flexible benefit options?

3. Transactional Function
Request to withdraw/borrow a certain amount from my savings and/or investment account.
Request to change my contributions to my savings and/or investment account.
Request to enroll in a particular benefit and/or financial plan.
Request to change the allocation of contributions.
Request to transfer funds from one account to another.
Request to enroll in a benefit program.

An employee can terminate a session at the terminal at any point in time by following the instructions on the screens.

Environments

The following describes the environments for which the benefit and financial communication systems have been developed. Specific items are highlighted to reflect the inherent differences and terminology associated with the technologies presently in use to support the benefit and financial communication service.

VM ENVIRONMENT
VM Definition

"A system control program made available by International Business Machines Corporation (IBM) which is adapted to control 'virtual machines' is referred to by the abbreviation "VM". A virtual machine is the functional equivalent of a real machine; however where the real machine has lights to show status and buttons and switches on the console of the machines to control it, the virtual machine has a virtual system console to display status and a command language to start operations and control them ... "[1] The virtual system console is the terminal 20 used for the benefit communication terminal supported by VM.

[1] IBM Virtual Machine Facility/370: CMS Command and Macro Reference.

VM Components

1. User Terminal—The Benefit and Financial Communication Terminal operates using IBM 3279 color CRT's (21). For actual operation by an employee, 12 PF (program function) keys are utilized as well as the RESET key. The 3279 CRT's may utilize any of several types of keyboards (22b), but in all cases, only the thirteen keys specified will be necessary to operate the Benefit and Financial Communication Terminal. On terminals with more than the necessary keys, a cover is provided for the unnecessary keys.

2. Host Computer—Terminals are wired to IBM Control Units, connected to modems, which are wired to IBM mainframe computer(s).

3. Programs—A Cobol Driver program controls the terminal session with the employee. Once the Benefit and Financial Communication Terminal 20 is activated (see VM Logon Procedure) an employee can begin his session and view screens pertaining to his individual benefits. This is accomplished by selecting a benefit off of the choice screen and pressing the corresponding button for that benefit. A Cobol Driver program then calls the appropriate program module, displays the appropriate screen, and accesses the appropriate file containing the benefit data. This data is then placed on the response screen for the user to view. The user then has the option of printing the screen being viewed, selecting to look at a more detailed screen for additional information, going back to the choice screen to select another benefit to view or ending the session. The program module gets control of the session from the Driver and retains control for as long as the user remains in the particular benefit and financial information set.

4. Screen Presentation—Screens that appear on the CRT's are coded using DMS (Display Mapping System) and are called via the Cobol programs. The personalized benefit data is placed on the response screen for the employee to view. The employee then has the option of printing the screen he is viewing, selecting to look at a more detailed screen for the same benefit, going back to the choice screen to select another benefit to view or ending the session at the Benefit and Financial Communication Terminal.

VM Logon Procedure (Autolog)

The locaton (address) of a benefit and financial communication terminal CRT is included in the operating system software. When the computer system is brought up by the system administrator and as long as the CRT power supply is on, the CRT will be automatically logged onto the system and the introductory screen will be on the CRT, awaiting use by employees. A special keypad 22b may be installed on CRT's having this logon method. The system software shuts down the benefit and financial planning center at the end of the workday or whenever it is scheduled to be shut down.

VIDEOTEX ENVIRONMENT
Videotex Definition

Videotex is a generic term for computer services that display textual and graphical information on remote video screens with two-way interactive capabilities. The key element in its system design is the focus on the untrained (non-computing or non-electronic) user. A videotex system is an extension of an existing computer system.

Videotex Components

1. User Terminal—composed of keyboard 22a for selecting the desired information/service and for data entry; modem (connectors) plugging the terminal to the communications line; and the display screen 21, which consists of a decoder and display generator.
2. Host Computer—a stand-alone computer system on the minicomputer (e.g., Honeywell DPS Level 6 and IBM Series 1 systems) or a mainframe computer (e.g., IBM 370 or 30XX based system).
3. Services—a subsystem of the videotex network which provides a particular service to the user. A videotex service is a comprehensive information-communication system under user control. Information and transactions are made or messages are sent (and even received) at the express command of the user. The main service is inquiry (information retrieval), but also available are transactional capabilities for financial services, computations, and message services.
4. Communications Media—the telephone system usually provides for the communication with the user terminal.
5. Composition (Editing or Information Provider) Terminal—composed of keyboard, monitor, disk drive and software for the preparation and maintenance of the information available in the videotex service.
6. Videotex software—a range of modular videotex software which extend current data processing applications to simple videotex terminals/kiosks and which manage the videotex databases related to the corporation's files or databases, for example, MULTITEL of CAP GEMINI SOGETI DASD.

Videotex Function Keys

The following function keys are found on the videotex user terminal 22a and, although not mentioned on every screen, can be used from any screen for the functions specified. This list is included in the service and can be viewed by the user from any screen on the service by depressing the GUIDE function key.

| Key | When Used |
|---|---|
| SEND | After keying a character (alphabetic or numerical). Represents a CR (carriage return). |
| PREVIOUS | To return the user to a previous message or a higher level (upper or parent node) in the tree structure. |
| GUIDE | To obtain help (instructions). |
| NEXT | To view the next message (screen) in the sequence. |
| INDEX | To return to the last menu screen in that service. |
| CANCEL | To correct the last character entered. |
| ERASE | To delete all characters entered. |

Videotex Logon Procedure

The system operator brings up the system on a daily basis by dialing the appropriate extension to connect the system with the computer. Upon receiving the appropriate dial tone from the telephone, the system operator will press the connection key on the terminal keyboard which will bring up certain system prompts. These prompts request the appropriate system identification and password. A valid identification sequence will result in the display of the introductory screen that is presented to the employee. At the end of the day the appropriate key is pressed to shut down the system.

Searching Techniques

The searching procedure involved in using a videotex service is extraordinarily simple due to the focusing of technology on people with little knowledge with computers. Depending on the videotex network the user can dial up the host computer 24 to connect the user terminal 20 to the line or this connection can automatically be made available. Once the connection is established, the user merely enters the information requested, usually some form of identification or password, and selects the information required with the assistance of the keyboard 22a. Upon entering valid identification, the user is allowed to make choices from tables of contents (or menus) and retrieve screens of information (or pages) either by following an inverted tree structure or searching with keywords. The inverted tree structure involves a series of menus in which each menu choice leads to another menu. The user moves from general menus to more specific ones until the desired information is reached. Keywords can be used to quickly retrieve one or more pages that have been specifically designated by the keyword within the service.

Display Facilities and Coding

In accordance with the invention, the current videotex prototype is based upon the French format called "Antiope", however, the benefit and financial communication service is not limited to this format in establishing future videotex employee benefit and financial planning centers. The Antiope format uses alphamosaic coding (i.e., pictures composed of small character size blocks) and also employs dynamically redefinable character sets (DRCS) which allow the system to exchange one series of characters for another.

Alphanumeric characters are based on the IOS (International Organization for Standadization) character set that is similar to ASCII (American National Standard Code for Information Interchange). The semigraphic set includes sixty-four shapes with each shape obtained by dividing the screen (comprised of 24 rows; each row contains 40 characters) into a matrix. Each block formed is further divided into a 3 by 2 mosaic block (or box) which form six mosaic elements. The points of the block belong either to the character itself or to the screen background, thus defining 64 different possible shapes.

A character is determined by its shape (based on the character set), and by its presentation as defined by one or more display attributes, such as character color (eight colors are available), background color, single or double height, single or double width, flashing, masking, lining (the underlining in alphabetical and disjointing in graphical representation), and positive/negative where the character points become background points and vice versa.

Pages of information and graphics are created on the composition terminal and stored on disk and/or in a computer database. The database design is such that it permits the accessing and rapid retrieval of specific information through the inverted tree structure or keyword searching techniques. The transmission lines between the user and the computer include the public telephone network (using appropriate modems to convert analog telephone signals into digital form for display). A modified TV monitor (receiver) with a decoder translates the data and builds up the video image. In videotex telephone systems, the transmission of data to the user is usally at a higher speed (1200 bits per second) than the transmission from the user to the computer (75 bits per second).

Application programs are written in COBOL but are not limited to this language. They retrieve data from the database, apply calculations when necessary, and pass this information to the system program responsible for interfacing the data with the appropriate screen. The application programs are able to accept data entered by the user, as well as handle several of the function keys on the user terminal that are used to quickly traverse the tree structure or service, such as:

1. GUIDE which provides the user with information on how to use the system and terminal.
2. PREVIOUS which displays the prior screen.
3. INDEX which gets you back to the last menu screen.
4. ERASE which allows you to correct information entered.
5. NEXT which allows you to view the next screen.

Operation

The benefit and financial communication service features a CRT terminal 20 which is specially adapted for ease-of-use, offering untrained (non-computing or non-electronic) employees an opportunity to enter into a dialogue with the computer 24 which maintain their benefits and financial information. In addition to the terminal 20, the system includes the computer 24, which stores the software (programs) and the database, and communications facilities, which provide the transmission media (wires and cables) and the switching and signalling equipment required for the interface with the terminal. The software consists of the operating system and the specialized programs (program modules) which direct and control the dialogue with the employee and provide the required responses based upon the employee's inquiry and the personal information contained in the database. The database contains an extract of the company's benefit files on all participating employees. An extract is used so as to capture and retain only the information necessary to satisfy and support the benefit and financial communication service. The extract is updated periodically to reflect the most recent data. The screens or pages that are presented to the employee are contained in a separate file, which is accessed by the specialized programs when the appropriate information is requested.

By visiting a benefit and financial communication terminal 20 an employee can access personalized benefits and financial information relating to his employee benefits. A typical session at the terminal involves a very simple sign-on procedure by which the employee is asked to identify himself. The screens displayed on the terminal thereafter guide the employee through every step of the session and the operation of the terminal 20 is no more complex than using the telephone. The first screen is an introductory screen, followed by a screen requesting the employee's identity which can be in the form of a social security number, employment number, and/or Personal Identity Number. This data entry is accomplished at the terminal 20. The system verifies the employee's identity and allows authorized employees to continue the session. Non-authorized persons will be restricted from viewing information through the benefit and financial communication service. As the session continues the employee is presented with a series of options (choices) which include the benefits available to the employees of the corporation that is sponsoring the benefit and financial communication service. The benefits include, but are not restricted to, the following:

Medical Benefits (Comprehensive and Major Medical Plans)
Disability Benefits (Short-term and Long-term Disability)
Retirement/Pension Benefits
Survivor Benefits
Group Insurance (Personal and Dependent)
Savings Plans
Investment Plans
Flexible Benefits
Loans The employee is then directed to select an option from the choice (menu) screen 31. Once a selection is entered on the terminal 20, the corresponding program module locates the employee benefit or financial information desired from the appropriate file, performs specific tasks (e.g., calculations if necessary, and inserts the personalized information on the screen. The major portions of the displayed screens are predefined with text and graphics, while certain areas are designated for variable data. This variable data field is completed using personal information that originated in the extract from the database or was computed by the program module. A single screen can possess several variable data fields. Once the variable data is inserted the screen is displayed for the employee to view.

In addition to making selections, employees may be requested, based on their selections, to enter information that will originate transactions. For instance, upon viewing certain savings account balances, the employee may choose to transfer funds between accounts, change the allocation or participation, or make withdrawals or various other financial transactions. All of these transactions are carried out without clerical intervention and automatically cause the system to update the personal information in the database, generate a check when necessary, and produce written confirmation.

Through the benefit and financial communication service, employees can also participate in useful and personal financial planning exercises (e.g., "what if" games) that can assist them in making more informed benefit and financial decisions in the future. For instance, the employee can enter personalized information which can be treated independently or associated/merged with the data already in the extract to provide a new and more extended view of the information. By doing this, the employee can examine different financial conditions in a manner that is not readily available without extensive mathematical calculations and the assistance of an accountant or financial consultant. The employee can also simulate various scenarios by selecting alternative benefit and/or financial strategies from a matrix of benefit and/or financial options (such as with Flexible Benefit plans) and see the effects of these selections. In this way, the employee can bring together the best combination of benefits to achieve the individually desired level of coverage, while at the same time maximizing savings and minimizing costs and taxes.

During any session the employee can take advantage of one or all of the capabilities offered (e.g., inquiry, transactional, "what if" games) simply by following the instructions on the screen. Each screen is presented in clear and concise language and provides sufficient information to enable the employee to continue the session, select another choice, print a copy of the screen, or terminate the session. The pressing of the appropriate key will terminate the session. Once a session is terminated, the introductory screen is automatically displayed to welcome the next employee who uses the Benefit and Financial Communication to Service.

In summary, the benefit and financial communication service provides an employee, and later other consumers, with the ability to easily determine:

What are my current benefits and savings balances?

What does a new savings plan, stock option plan, or other benefit mean to me now and what will it mean in the future?

How much will I have if I "save" X dollars per week for Y years at Z interest rate?

What if I increase my rate of savings?

Can I afford increased savings?

The results of withdrawing money from a savings and/or investment account.

These are merely examples of the types of personal benefit and financial activity which can be conducted via the benefit and financial communication service, and are not intended to be exhaustive.

What is claimed is:

1. In a system for making available financial and employee benefit information of any one individual of a group of individuals, the system having a computer which stores a plurality of programs including a plurality of operating programs for carrying out the functions of the system and a plurality of program modules relating to the financial and employee benefit information of an individual and a data base including the financial and employee benefit information for each individual of the group of individuals, the improvement comprising the plurality of program modules including at least one predetermined program module for calculating at least one of a plurality of possible options in financial and employee benefits in response to a request of the individual, a computer terminal adapted to be connected to the computer and adapted to be operated by any individual of the group without formal training in operating a computer terminal to present financial and employee benefit information of the individual operating the terminal in response to a command of the individual, the computer terminal including means for presenting visual information to the individual operating the terminal; and means for receiving the command of an individual operating the terminal to (i) select a predetermined program module in the computer to present predetermined financial and employee benefit information of the individual operating the terminal;

(ii) introduce data to the computer relating to the individual using the terminal which is not in the data base of the computer; and (iii) activate at least one predetermined program module to calculate at least one of the plurality of options in benefits for the individual by utilizing the data in the data base of the computer and the introduced data relating to the individual using the terminal.

2. In a system in accordance with claim 1 in which the computer terminal further comprises means responsive to the identification of an individual of the group who is to operate the terminal for activating the terminal.

3. In a system in accordance with claim 2 in which the activating means comprises means responsive to an input of the individual operating the terminal which corresponds to the identity of the individual in the data base.

4. In a system in accordance with claim 1 in which the means for presenting visual information to the individual operating the terminal comprises:

a screen for providing a visual display of information; and means connected to the computer and the database for converting information from the program modules and database into visual displays on the screen.

5. In a system in accordance with claim 4 in which the information converting means further comprises means for forming graphics representative of information from the program modules and database.

6. In a system in accordance with claim 1 in which the input receiving means comprises means responsive to manual contact therewith by the individual operating the terminal for producing an input therefrom.

7. In a system in accordance with claim 6 in which the input producing means comprises a keyboard.

8. In a system in accordance with claim 1 in which the means for receiving an input of an individual operating the terminal is further adapted to introduce data to the computer which initiates permutations of the program modules of the computer.

9. In a system in accordance with claim 1 in which the means for receiving an input of an individual operating the terminal is further adapted to introduce inputs which initiate interaction between the individual operating the terminal and the program modules of the computer.

10. In a system in accordance with claim 1 in which the means for receiving an input of an individual operating the terminal is further adapted to accommodate inputs which initiate transactions between the program modules of the computer.

11. In a system in accordance with claim 1 in which the program modules relating to employee benefit information comprise program modules relating to at least one of employee benefit planning, financial planning, and retirement planning.

12. In a system in accordance with claim 1 in which the data base comprises at least a portion of the information corresponding to that of the file of benefit information of an individual who is an employee.

13. In a system in accordance with claim 1 in which the computer terminal further includes means for producing a copy of at least a portion of the visual information of the presenting means.

14. In a system in accordance with claim 13 in which the computer terminal further comprises means responsive to an input of the individual operating the computer terminal for selectively activating the copy producing means.

15. In a method for making available financial and employee benefit information of any one individual of a group of individuals, the method being adapted to be carried out by use of a computer which stores a plurality of programs including a plurality of operating programs for carrying out the functions of the method and a plurality of program modules relating to the financial and employee benefit information of an individual, and a data base including the financial and employee benefit information for each individual of the group of individuals, the improvement in the method in which the plurality of programs includes at least one program module for calculating a plurality of projections of financial and employee benefits by performing predetermined calculations on variable data and comprising the steps of using a computer terminal adapted to be connected to the computer and adapted to be operated by any individual of the group without formal training in operating a computer terminal to present financial and employee benefit information of the individual operating the terminal in response to the command of the individual, the step of using the computer terminal including presenting on the computer terminal visual information to the individual operating the terminal; and receiving an input of an individual operating the terminal for
  (i) selecting a predetermined program module in the computer to present predetermined financial and employee benefit information of the individual operating the terminal;
  (ii) introducing data to the computer relating to the individual using the terminal which is not in the data base of the computer; and
  (iii) selecting a predetermined program module in the computer to make projections of financial and employee benefits for the individual by utilizing the data in the data base of the computer and data entered by the individual.

16. In a method in accordance with claim 15 in which the step of presenting visual information to the individual operating the terminal comprises:
  displaying on a screen a visual display of information; and
  converting information from the program modules and database of the computer into visual displays on the screen.

17. In a method in accordance with claim 16 in which the step of converting information further comprises:
  means for forming graphics representative of information from the program modules and the database of the computer.

18. In a method in accordance with claim 15 and further comprising the step of activating the computer terminal in response to the identification of an individual of the group who is to operate the terminal.

19. In a method in accordance with claim 18 in which the step of activating the terminal is in response to the inputting of the identify of the individual in the data base of the computer.

20. In a method in accordance with claim 15 in which the step of receiving an input of an individual operating the terminal includes accommodating inputs which initiate transactions between the program modules in the computer.

21. In a method in accordance with claim 15 in which the step of selecting the program module related to the employee benefits comprises selecting a program module relating to at least one of employee benefit planning, financial planning, and retirement planning.

22. In a method in accordance with claim 15 in which the data base comprises at least a portion of the information corresponding to that of the benefits file of an individual who is an employee.

23. In a method in accordance with claim 15 and further comprising the step of producing a copy of at least a portion of the visual information being presented.

24. A system for making available financial and employee benefit information of any one individual of a group of individuals, comprising:
  (a) a computer including
    (i) a plurality of programs having a plurality of operating programs for carrying out the functions of the system;
    (ii) a plurality of program modules relating to the financial and employee benefit information of an individual, including at least one program module for offering benefit information options that can be selected by the individual, at least one program module for presenting benefit information of the individual by outputting predetermined information and data relating to the individual, at least one program module for initiating financial transactions in response to data introduced by the individual, and at least one program module for calculating a plurality of projections of financial and employee benefits in which the calculations are predetermined and the data used in calculating the projections can be varied; and
    (iii) a data base including the financial and employee benefit information for each individual of the group of individuals,
  (b) means connected to the computer and adapted to be operated by any individual of the group without formal training in operating a computer for inputting instructions into the computer relating to financial and employee benefit information of the individual operating the system, the inputting means being adapted to receiving an input of an individual operating the inputting means to
    (i) select a benefit information option from among the choices offered by the system;
    (ii) select a predetermined program module in the computer to present predetermined financial and employee benefit information and data in the data base relating to the individual operating the inputting means;
    (iii) introduce data to the computer relating to the individual using the system which is not in the data base of the computer;
    (iv) select a predetermined program module in the computer to initiate financial transactions; and
    (v) select a predetermined program module in the computer to make projections of financial and employee benefits for the individual by utilizing the data in the data base of the computer and data entered by the individual; and
  (c) means connected to the computer for presenting visual information to the individual operating the inputting means system.

25. A system in accordance with claim 24 in which the means for presenting visual information to the individual operating the inputting means comprises:
  a screen for presenting a visual display of information to the individual operating the inputting means; and
  means connected to the computer and the screen for converting information from the program modules and the database of the computer into visual displays on the screen.

26. A system in accordance with claim 25 in which the information converting means further comprises means forming graphics representative of information from the program modules and the database.

27. A system in accordance with claim 25 in which the information converting means comprises means responsive to inputs at the inputting means for forming visual displays of the inputs which can be observed by the individual operating the system.

28. A system in accordance with claim 24 further comprising means for activating the system responsive to the identification of an individual of the group who is to operate the inputting means.

29. A system in accordance with claim 28 in which the activating means comprises means responsive to an input of the individual operating the inputting means which corresponds to the identity of the individual in the data base of the computer.

30. A system in accordance with claim 24 in which the inputting means comprises means responsive to manual contact therewith by the individual operating the inputting means for producing an input therefrom.

31. A system in accordance with claim 30 in which the input producing means comprises a keyboard.

32. A system in accordance with claim 31 in which the keyboard includes keys adapted to provide predetermined inputs relating to selected predetermined program modules.

33. A system in accordance with claim 24 in which the inputting means is further adapted to introduce data to the computer which initiates permutations of the program modules of the computer.

34. A system in accordance with claim 24 in which the inputting means is further adapted to introduce inputs which initiate interaction between the individual operating the inputting means and the program modules of the computer.

35. A system in accordance with claim 24 in which the inputting means is further adapted to accommodate inputs which initiate transactions between the program modules in the computer.

36. A system in accordance with claim 24 in which the employee benefits related to the financial and employee benefit information of a individual comprise at least one of employee benefit planning, financial planning, and retirement planning.

37. A system in accordance with claim 24 in which the data base comprises at least a portion of the information corresponding to that of the file of benefit information of an individual who is an employee.

38. A system in accordance with claim 24 in which the computer terminal further includes means for producing a copy of at least a portion of the visual information of the presenting means.

39. A computer terminal for making available financial and employee benefit information of any one individual of a group of individuals, the terminal being adapted to be connected to a computer which stores a plurality of operating programs for carrying out the functions of the system and a plurality of program modules relating to the financial and employee benefit information of an individual, including at least one program module that executes a predetermined set of mathematical operations on hypothetical data in order to make projections of financial and employee benefits, and being adapted to be operated by any individual of the group without formal training in operating a computer terminal to present financial and employee benefit information of the individual operating the terminal in response to the command of the individual, the terminal comprising means for presenting visual information to the individual operating the terminal; and means for receiving an input of an individual operating the terminal to
(i) select a predetermined program module in the computer to present predetermined financial and employee benefit information of the individual operating the terminal;
(ii) introduce data to the computer relating to the individual which is not in a data base of the computer that includes the financial and employee benefit information for each individual of the group of individuals; and
(iii) select a predetermined program module in the computer to make projections of financial and employee benefits for the individual by utilizing hypothetical data from the data base of the computer and data entered by the individual.

40. In a system for making available information relating to financial transactions with a business organization of any one individual of a group of individuals who have financial transactions with the business organization, the system having a computer which stores a plurality of programs including a plurality of operating programs for carrying out the functions of the system and a plurality of program modules relating to information concerning the financial transactions of an individual with the business organization, and a data base including information relating to the financial transactions of any one individual of the group of individuals with the business organization, the improvement comprising a computer terminal adapted to be connected to the computer and adapted to be operated by any individual of the group without formal training in operating a computer terminal to present information of financial transactions of the individual operating the terminal in response to the command of the individual, the computer terminal including means for presenting visual information to the individual operating the terminal; and means for receiving an input of an individual operating the terminal to
(i) select a predetermined program module in the computer to present information relating to financial transactions of the individual operating the terminal;
(ii) introduce data to the computer relating to the individual using the terminal which is not in the data base of the computer; and
(iii) obtain projections of finances for the individual from the computer by entering hypothetical data into the computer through the terminal.

41. In a method for making available financial and employee benefit information relating to financial transactions with a business organization of any one individual of a group of individuals who have financial transactions with the business organization, the method being adapted to be carried out by use of a computer which stores a plurality of programs including a plurality of operating programs for carrying out the functions of the method and a plurality of program modules relating to the information concerning financial transactions of an individual with the business organization and a data base including information relating to the financial transactions of any one individual of the group of individuals with the business organization, the improvement in the method in which the plurality of programs includes at least one program module for offering benefit information options that can be selected by the individual, at least one program module for presenting benefit information of the individual by outputting predetermined information and data relating to the individual, at least one program module for initiating financial transactions in response to data introduced by the individual, and at least one program module for calculating a plurality of projections of financial and employee benefits in response to a request of the individual and comprising the steps of using a computer terminal adapted to be connected to the computer and adapted to be operated by any individual of the group without formal training in operating a computer terminal to present information relating to the financial transactions with the business organization of the individual operating the terminal in response to the command of the individual, the step of using the computer terminal including presenting on the computer terminal visual information to the individual operating the terminal; and receiving an input of an individual operating the terminal for
  (i) selecting a benefit information option from among the choices offered by the method;
  (ii) selecting a predetermined program module in the computer to present predetermined information relating to financial transactions with the business organization of the individual operating the terminal;
  (iii) introducing data to the computer relating to the individual using the terminal which is not in the data base of the computer;
  (iv) selecting a predetermined program module in the computer to initiate financial transactions; and
  (v) selecting a predetermined program module in the computer to make projections of financial and employee benefits for the individual in response to the request of the individual.

* * * * *

UNITED STATES PATENT AND TRADEMARK OFFICE
CERTIFICATE OF CORRECTION

PATENT NO. : 4,648,037  Page 1 of 2
DATED : March 3, 1987
INVENTOR(S) : James A. Valentino It is certified that error appears in the above—identified patent and that said Letters Patent is hereby corrected as shown below:

Column 3, line 59, delete "moudles" and insert --modules--;

Column 7, line 1, delete "transactioons" and insert --transactions--;

Column 13, line 30, delete "maintain" and insert --maintains--;

Column 13, line 34, delete "communications" and insert --communication--;

Column 15, line 9, delete "Communication to Service" and insert --Communication Service--;

Column 17, line 55, delete "identify" and insert --identity--;

UNITED STATES PATENT AND TRADEMARK OFFICE
CERTIFICATE OF CORRECTION

PATENT NO. : 4,648,037
DATED : March 3, 1987
INVENTOR(S) : James A. Valentino

It is certified that error appears in the above—identified patent and that said Letters Patent is hereby corrected as shown below:

Column 19, line 46, delete "a" and insert --an--;

Column 19, line 65, delete "exectutes" and --executes--.

Signed and Sealed this

Eleventh Day of August, 1987

*Attest:*

DONALD J. QUIGG

*Attesting Officer*         *Commissioner of Patents and Trademarks*

UNITED STATES PATENT AND TRADEMARK OFFICE
CERTIFICATE OF CORRECTION

PATENT NO. : 4,648,037
DATED : March 3, 1987
INVENTOR(S) : James A. Valentino

It is certified that error appears in the above—identified patent and that said Letters Patent is hereby corrected as shown below:

Column 1, line 20, delete "employers" and insert --employees--;

Column 3, line 59, delete "moudles" and insert --modules--;

Column 4, line 43, delete "koisk" and insert --kiosk--;

Column 5, line 32, delete "videotax" and insert --videotex--;

Column 5, line 54, delete "main";

Column 5, line 57, delete "main";

Column 6, line 57, delete "employees's" and insert --employee's;

Column 7, line 1, delete "transactioons" and insert --transactions--;

Column 8, line 12, delete "and 'SEND'";

Column 8, line 12, delete "22a" and insert --22--;

Column 8, line 15 delete "and 'SEND'";

Column 8, line 15, delete "22a" and insert --22--;

UNITED STATES PATENT AND TRADEMARK OFFICE
CERTIFICATE OF CORRECTION

PATENT NO. :     4,648,037
DATED      :     March 3, 1987
INVENTOR(S) :    James A. Valentino It is certified that error appears in the above—identified patent and that said Letters Patent is hereby corrected as shown below:

Column 8, line 22, delete "22a" and insert --22--;

Column 10, line 25, delete "Cobol" and insert --COBOL--;

Column 10, line 32, delete "Cobol" and insert --COBOL--;

Column 10, line 47, delete "Cobol" and insert --COBOL--;

Column 10, line 56, delete "locaton" and insert --location--;

Column 13, line 30, delete "maintain" and insert --maintains--;

Column 13, line 34, delete "communications" and insert--communication--;

Column 15, line 9, delete "Communication to Service"and insert --Communication Service--;

Column 15, line 36, delete "data base" and insert --database--;

Column 15, line 62, delete "data base" and insert --database--;

Column 15, line 66, delete "data base" and insert --database--;

UNITED STATES PATENT AND TRADEMARK OFFICE
CERTIFICATE OF CORRECTION

PATENT NO. : 4,648,037
DATED : March 3, 1987
INVENTOR(S) : James A. Valentino

Page 3 of 4

It is certified that error appears in the above—identified patent and that said Letters Patent is hereby corrected as shown below:

Column 17, line 3, delete "data base" and insert --database--;

Column 17, line 33, delete "data base" and insert --database--;

Column 17, beginning line 54, delete "data base" and insert --database--;

Column 17, line 55, delete "identify" and insert --identity--;

Column 17, line 67, delete "data base" and insert --database--;

Column 18, line 29, delete "data base" and insert --database--;

Column 18, line 45, delete "data base" and insert --database--;

Column 18, line 49, delete "data base" and insert --database--;

Column 19, line 20, delete "data base" and insert --database--;

Column 19, line 46, delete "a" and insert --an--;

Column 19, line 50, delete "data base" and insert --database--;

UNITED STATES PATENT AND TRADEMARK OFFICE
CERTIFICATE OF CORRECTION

PATENT NO. : 4,648,037
DATED : March 3, 1987
INVENTOR(S) : James A. Valentino

Page 4 of 4

It is certified that error appears in the above—identified patent and that said Letters Patent is hereby corrected as shown below:

Column 19, line 65, delete "exectutes" and insert --executes--

Column 20, line 15, delete "data base" and insert --database--;

Column 20, line 22, delete "data base" and insert --database--;

Column 20, line 33, delete "data base" and insert --database--;

Column 20, line 55, delete "data base" and insert --database--;

Column 21, beginning line 1, delete "data base" and insert --database--;

Column 22, line 16, delete "data base" and insert --database--;

Signed and Sealed this

Twenty-ninth Day of September, 1987

Attest:

DONALD J. QUIGG

Attesting Officer    Commissioner of Patents and Trademarks